US006792041B1

(12) United States Patent
Kim et al.

(10) Patent No.: US 6,792,041 B1
(45) Date of Patent: Sep. 14, 2004

(54) DATA RATE DETECTION DEVICE AND METHOD FOR A MOBILE COMMUNICATION SYSTEM

(75) Inventors: Beong-Jo Kim, Songnam-shi (KR);
Min Goo Kim, Suwon-shi (KR);
Se-Hyoung Kim, Seoul (KR);
Soon-Jae Choi, Songnam-shi (KR);
Young-Hwan Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 923 days.

(21) Appl. No.: 09/613,114

(22) Filed: Jul. 10, 2000

(30) Foreign Application Priority Data

Jul. 8, 1999 (KR) ........................................ 1999-28321

(51) Int. Cl.[7] .............................................. H04B 17/00

(52) U.S. Cl. ....................................................... 375/225

(58) Field of Search ........................... 375/225; 370/252, 370/395.64, 395.65; 379/93.08; 702/60, 62; 704/214, 219, 221, 229

(56) References Cited

U.S. PATENT DOCUMENTS

| 5,341,396 A | 8/1994 | Higgins et al. |
| 5,864,548 A | 1/1999 | Liu |
| 5,911,128 A | * 6/1999 | DeJaco ..................... 704/200.1 |

FOREIGN PATENT DOCUMENTS

| EP | 0 713 305 | 5/1996 |
| GB | 2 301 999 | 12/1996 |
| JP | 11-055218 | 2/1999 |
| WO | WO 97/05717 | 2/1997 |

OTHER PUBLICATIONS

International Search Report dated Jun. 5, 2000 issued in a counterpart application, namely, Appln. No. PCT/KR00/00113.
K. Okawa et al., "Orthogonal multi-spreading factor forward link for coherent DS-CDMA mobile radio", IEEE 6th International Conference on Universal Personal Communications Record, vol. 2, pp. 618–622, Oct. 12–16, 1997.
F. Adachi et al., "Tree-Structured generation of orthogonal spreading codes with different lengths for forward link of DS-CDMA mobile radio", Electronics Letters, vol. 33, pp. 27–28, Jan. 1997.
Japanese Office Action dated Nov. 18, 2003 issued in a counterpart application, namely, Appln. No. 2001-509182.
PCT International Search Report, International Application No. PCT/KR00/00113 filed Feb. 14, 2000.
European search report dated Jan. 24, 2003, issued in a counterpart application, namely, Appln. No. 00942501.8.

* cited by examiner

*Primary Examiner*—Don N. Vo
(74) *Attorney, Agent, or Firm*—Dilworth & Barrese, LLP

(57) ABSTRACT

A data rate detecting device detects a data rate for a received signal based on a variation of the energy for the respective received signals between the two adjacent intervals upon failure to receive information about the data rate, and performs channel decoding of the detected data rate information. First, the data rate detecting device divides an interval defined as between a lowest and highest one of a plurality of given data rates into m discriminating intervals. Then, the device calculates a difference between an average energy of received signals up to an i'th discriminating interval and an average energy of received signals for an (i+1)'th discriminating interval, wherein i is an integer is less than m. If the difference between the average energies is greater than or equal to a threshold value, the device determines that the received signal in the (i+1)'th discriminating interval is transmitted at a data rate corresponding to the i'th discriminating interval.

5 Claims, 5 Drawing Sheets

DATA RATE DETECTION DEVICE AND METHOD FOR A MOBILE COMMUNICATION SYSTEM

PRIORITY

This application claims priority to an application entitled "Data Rate Detection Device and Method for Mobile Communication System" filed in the Korean Industrial Property Office on Jul. 8, 1999 and assigned Serial No. 99-28321, the contents of which are hereby incorporated by reference.

BACKGROUND OF THE INVENTION

1. Field of the Invention

The present invention relates generally to a channel signal receiving device and method for a mobile communication system, and more particularly, to a device and method for detecting the data rate of a received signal.

2. Description of the Related Art

Code division multiple access (CDMA) mobile communication systems have developed from the conventional mobile communication standard, which focused on voice service, to the IMT-2000 standard, which provides high-speed data transmission. The IMT-2000 standard encompasses various services, including high quality voice, moving pictures, and Internet browsing. Communication links provided between a mobile station and a base station in the CDMA mobile communication system are generally classified into a downlink (DL), directing data to the mobile station from the base station, and an uplink (UL), directing data to the base station from the mobile station.

For voice or data transmission on the downlink or uplink, the data rate of the data may dynamically vary periodically, where the period is a predetermined time, e.g., 10 msec, which depends on the type of service. Usually, information about the data rate is transmitted to a receiver and used for decoding. However, in the event the receiver fails to receive the information about the data rate, the receiver has to detect rate of the received signal actually transmitted from the transmitter by analyzing the received signal. This procedure, where the receiver detects the data rate from the received signal, is called "blind rate detection (BRD)".

A description is provided herein below for a BRD operation according to the prior art which is performed in the case of voice transmission using convolutional codes for the purpose of forward error correction (FEC).

First, it is assumed that a set of data rates of voice data which a receiver (i.e., mobile station) uses to service a transmitter (i.e., base station) is designated as $R=\{R_1, R_2, \ldots, R_n\}$, where the data rates are listed in ascending order. To detect an actual data rate $R_a$ reported by the transmitter, the receiver performs a Viterbi decoding of the data from the lowest data rate $R_1$ and then checks cyclic redundancy codes (CRC's). If the result of CRC check for $R_1$ is "good", there is a high probability that $R_a=R_1$, and $R_a$ is determined as the actually transmitted data rate to be $R_1$. If the result of the CRC check for $R_a$ is "bad", the receiver continues a Viterbi decoding of additional data up to the next data rate $R_2$, i.e., at a data rate ($R_2-R_1$), followed by CRC checks. As an attempt to reduce a false alarm potential of the BRD operation, the receiver checks an internal metric for Viterbi decoding, in addition to the CRC check.

As described above, the receiver first performs a Viterbi decoding and then a CRC check in order to detect a rate of convolution coded voice data. The BRD operation, however, is not easy to apply in the case of data transmission using turbo codes. This is because, unlike the Viterbi decoder, a turbo decoder has an internal turbo de-interleaver the type of which is dependent on the data rate. Specifically, when the result of CRC check at a given data rate is "bad", the turbo decoder has to repeat the data decoding process from the first data rate in order to check the CRC for a next data rate, while the Viterbi decoder has only to read additional data to the next data rate and then continue the data decoding. Another reason why the BRD operation is inadequate to the turbo decoder is in that the turbo decoding is usually performed iteratively, with the maximum number of iterations for a data rate being about 8 to 12, which leads to an increase in complexity of the decoder and which takes a long delay time when the iterative decoding is performed for CRC checks at all data rates.

SUMMARY OF THE INVENTION

It is, therefore, an object of the present invention to provide a device and method for detecting a data rate from a received signal upon failure to receive information about the data rate in a mobile communication system.

It is another object of the present invention to provide a device and method for detecting a data rate upon failure to receive information about the rate of turbo coded data.

It is yet another object of the present invention to provide a device and method for detecting a data rate not received during transmission of convolutional coded or turbo coded data.

It is still another object of the present invention to provide a device and method for reducing complexity of a data rate detecting operation upon failure to receive information about the data rate.

To achieve the above objects of the present invention, a data rate detecting device is provided that detects a data rate for a received signal based on a variation of the energy for the respective received signals between the two adjacent intervals upon failure to receive information about the data rate, and performs channel decoding of the detected data rate information.

The data rate detecting device first divides an interval defined as between a lowest and highest one of a plurality of given data rates into m discriminating intervals. Then, the device calculates a difference between an average energy of received signals up to an i'th discriminating interval and an average energy of received signals for an (i+1)'th discriminating interval, wherein i is an integer and is less than m. If the difference between the average energies is greater than or equal to a threshold, the device determines that the received signal in the (i+1)'th discriminating interval is transmitted at a data rate corresponding to the i'th discriminating interval.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Turning to the drawings, a preferred embodiment of the present invention is described hereinbelow in detail with reference to the accompanying drawings. In the following description, well-known functions or constructions are not described in detail to avoid obscuring the invention in unnecessary detail.

Figure 1:
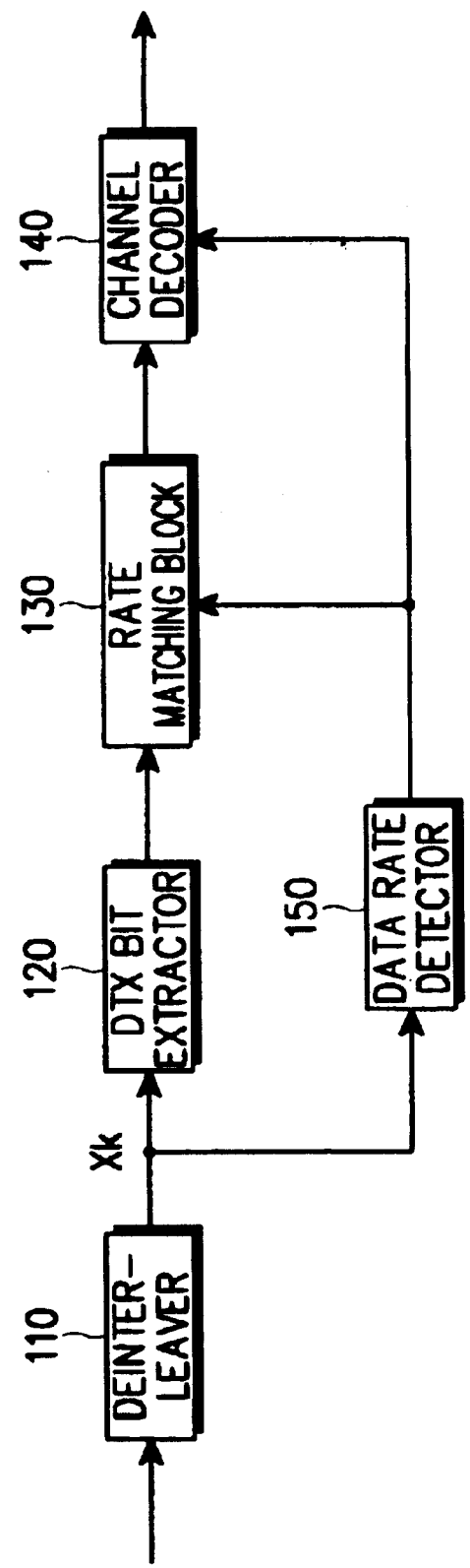
FIG. 1 is a schematic block diagram illustrating a decoder for a mobile communication system including a data rate detector in accordance with the present invention.

FIG. 1 is a schematic block diagram of a decoder of a mobile station receiver in a mobile communication system including a data rate detector in accordance with the present invention. The invention is applicable to any CDMA mobile communication system, such as universal mobile telecommunication system (UMTS), CDMA2000, etc.

Referring to FIG. 1, a de-interleaver 110 de-interleaves a received signal to generate a de-interleaved signal (symbol) $X_k$. Discontinuous transmission (DTX) bit extractor 120 extracts, from the de-interleaved signal $X_k$, bits indicating a discontinuous transmission mode received from a base station in a discontinuous transmission mode of the mobile communication system. Data rate detector 150 detects a variable data rate of the received signal (symbol) $X_k$ de-interleaved at the de-interleaver 110, ultimately detecting the rate of the received data upon the failure to receive information regarding the data rate. Specifically, the data rate detector 150 measures variations of energy for each received signal in two adjacent intervals and detects the data rate of the received signal based on the result of detection. The information about the data rate detected at the data rate detector 150 is applied to a rate matching block 130 and a channel decoder 140. The rate matching block 130 receives the de-interleaved symbols to perform a reverse process of puncturing, i.e. symbol insertion, and a reverse process of repetition, i.e. symbol combining, thus generating rate-matched symbols. Channel decoder 140 decodes the rate-matched symbols received from the rate matching block 130. The channel decoder 140 may be implemented with a convolutional decoder or a turbo decoder. The rate matching block 130 and the channel decoder 140 use the data rate information received from the data rate detector 150 to perform rate matching and channel decoding operations.

Figure 2:
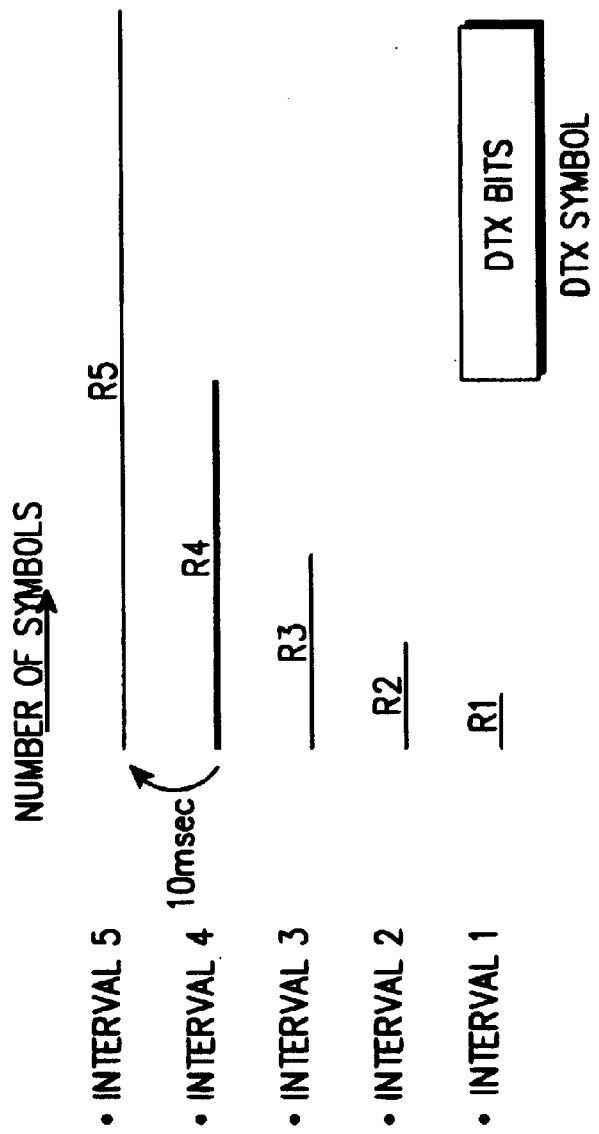
FIG. 2 is a diagram illustrating a data rate detecting operation in accordance with the present invention.

FIG. 2 is an illustration for explaining a data rate detecting operation of the present invention performed at the data rate detector 150 shown in FIG. 1.

First, it is assumed that the number of symbols received at the mobile station receiver varies in the order of $R_1$, $R_2$, $R_3$, $R_4$ and $R_5$ over time, as shown in FIG. 2. A change in the number of symbols by the interval, e.g., 10 msec means that the data rate is variable. Thus it should be noted that the term "the number of symbols" is substantially interchangeable with the term "data rate".

FIG. 2 shows a case where the base station transmitter correctly transmits data for intervals 1 to 4 but fails to transmit data between intervals 4 and 5. The data symbols in the transmission intervals 1 to 4 are de-interleaved at the de-interleaver 110 shown in FIG. 1 and stored in an internal buffer of the DTX(Discontinuous Transmission) bit extractor 120. Between the intervals 4 and 5, the base station transmitter sends DTX bits in a DTX mode. For such a DTX interval, the base station transmitter disables the transmission power and only an additive white Gaussian noise (AWGN) exists. So, the data rate is $R_4$ for the DTX interval 5. As such, the present invention uses a fundamental principle that involves determination of a presence of the data in substantially non-transmission intervals for data or data rate information, and ultimately detection of the data rate.

Now, a detailed description will be given to the principle of the data rate detection according to the present invention.

Expediently, it is assumed that there are two data rates $R_1$ and $R_2$. In such a case, the following equations may be used in order to determine, without receiving any data rate information, whether a signal has been transmitted at $R_1$ or $R_2$. When the received signal from bit position 1 to bit position $R_1$ is $X_1$, and the received signal from bit position $(R_1+1)$ to bit position $R_2$ is $X_2$, the signals $X_1$ and $X_2$ are expressed by:

$$X_1 = A_1 \times a_1 + n_1$$

$$X_2 = A_2 \times a_2 + n_2 \qquad \text{[Equation 1]}$$

In Equation 1, $A_1$ and $A_2$ represent transmission power levels of the signals transferred from the base station transmitter to the mobile station receiver and correspond to ±A in the presence of the signals or "0" for DTX; $a_1$ and $a_2$ represent Rayleigh random variables having a probability function of $p(a_1)=2 \times a_1 \times \exp(-a_1^2)$ or $p(a_2)=2 \times a_2 \times \exp(-a_2^2)$, respectively; and $n_1$ and $n_2$ represent AWGN random variables with mean "0" and variance $\sigma^2$. If the noise variance of the transmission channel is $\sigma^2$, the interval-based energy (power) of the received signal is given by:

$$E\{X_1^2\} = A_1^2 + \sigma^2$$

$$E\{X_2^2\} = A_2^2 + \sigma^2 \qquad \text{[Equation 2]}$$

The differentiation equation of the energies $E\{X_1^2\}$ and $E\{X_2^2\}$ of the received signals gives DI as expressed by:

$$D_1 = |E\{X_1^2\} - E\{X_2^2\}| = |A_1^2 - A_1^2| \qquad \text{[Equation 3]}$$

In Equation 3, if $A_1^2 = A_2^2$, $D_1$ is "0"; otherwise, if $A_2^2 = 0$ (i.e., for DTX), $D_1$ is "$A_1^2$". Namely, when the actual data rate is $R_2$, $D_1$ nearly reaches "0"; otherwise, when the actual data rate is $R_1$, $D_1$ becomes almost "$A_1^2$".

The above equations can be applied only if the secondary probability characteristic, average deviation $\sigma^2$ is known irrespective of the probability functions $p(a_1)$ and $p(a_2)$ of the Rayleigh random variables. It is of cause assumed that the random variables is not time varying. For reference, the differentiation result of the energies of the received signals $D_1 = |E\{X_1^2\} - E\{X_2^2\}|$ can be calculated from a given interval-based energy of the individual received signals. The most important variable in determining $D_1$ may be the accumulation of data sufficient to determine the average energy value. An accurate data rate may be determined when the minimum data rate $R_1$ is 32 kbps, i.e., the data transmitted in the 10 msec frame interval is more than 320 bits.

The above-stated data rate detecting operation can be generalized as follows.

First, it is assumed that a set of serviceable data rates is designated as $R = \{R_1, R_2, \ldots, R_n\}$, in which the data rates are listed in the ascending order. Information about the serviceable data rates is called "transport format set (TFS)" given to the mobile station by the base station in a call setup phase. If information about n data rates is given, one interval is first assigned to the largest data rate $R_n$ and (n-1) intervals are assigned to the other data rates. To be differentiated from the interval assigned to the largest data rate $R_n$, (n−1) intervals for the other data rates are defined as discriminating intervals. The data rate of the received signal for the individual is detectable. For instance, an average energy of the received signals up to the i'th discriminating interval is subtracted from an average energy of the received signals up to the (i+1)'th discriminating interval. The resulting subtracted value is compared to a predetermined threshold to detect the data rate of the received signal for the (i+1)'th interval.

Now, the operation of detecting the data rate of the received signal for the (i+1)'th interval is described in connection with generalized expressions as follows. A received signal up to the i'th interval designated as $X_i$ can be defined as:

$$X_i = A_i \times a_i + n_i \qquad \text{[Equation 4]}$$

In Equation 4, $A_i$ represents the transmission power level of the base station transmitter and correspond to ±A in the presence of the signal or "0" for DTX; and $a_1$ and $n_i$ represent the Rayleigh random variable and the AWGN random variable as defined above, respectively. From Equation 3, a decision criterion can be defined as in Equation 5 below, from 1 to n. When the received signal up to the i'th interval is $X_i$ and a received signal up to the (i+1)'th interval is $X_{i+1}$, the differentiation result of the energies $E\{X_i^2\}$ and $E\{X_{i+1}^2\}$ of the received signals gives $D_i$ as expressed by:

$$D_i = |E\{X_i^2\} - E\{X_{i+1}^2\}| = |A_i^2 - A_{i+1}^2| \qquad \text{[Equation 5]}$$

In Equation 5, if the data are continuously transmitted up to the (i+1)'th interval, i.e., $A_i^2 = A_{i+1}^2$, then $D_i$ is "0"; otherwise, if the data are transmitted up to the i'th interval but not transmitted from the i'th to the (i+1)'th interval (for DTX), i.e., $A_{i+1}^2 = 0$, then $D_i$ is "$A_i^2$". Therefore, during DTX ($A_{i+1}^2 = 0$), the mobile station receiver searches for the initial index i and considers the corresponding $R_i$ as the actual data rate for the received data from the base station transmitter.

Figure 3:
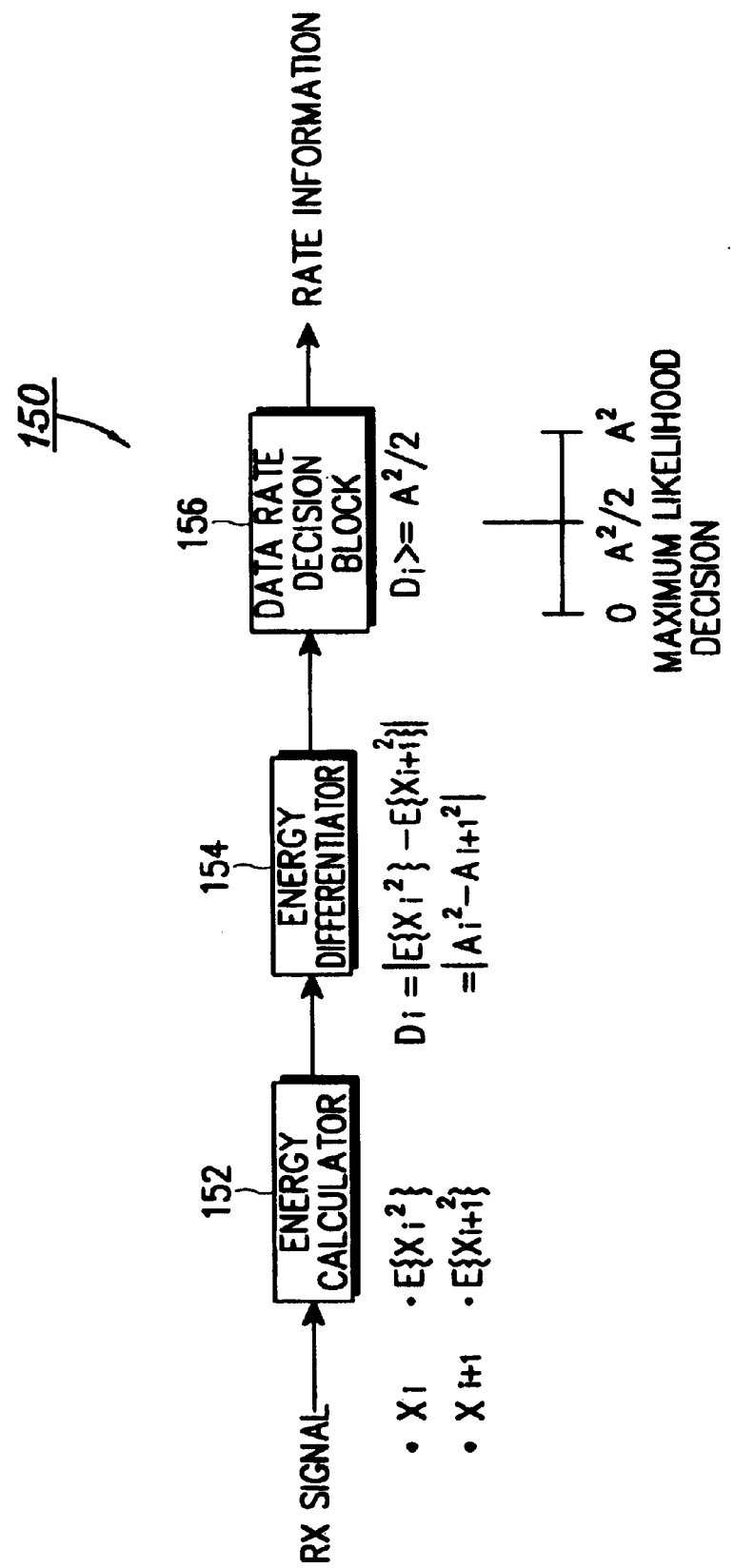
FIG. 3 is a detailed block diagram illustrating the data rate detector shown in FIG. 1.

FIG. 3 is a schematic block diagram of the data rate detector 150 shown in FIG. 1, in which the data rate detector 150 comprises an energy calculator 152, an energy differentiator 154 and a data rate decision block 156.

Referring to FIG. 3, the energy calculator 152 measures energy $E_i$ for a received signal $X_i$ up to the i'th interval and energy $E_{i+1}$ for a received signal $X_{i+1}$ from the i'th interval to the (i+1)'th interval. Namely, the energy calculator 152 accumulates the received signals up to the i'th interval and the received signals up to the (i+1)'th interval to calculate energies $E_i$ and $E_{i+1}$ for the respective received signals $X_i$ and $X_{i+1}$ according to Equation 6 below, which is used to calculate energy $E_{i+1}$ for the received signal $X_{i+1}$.

$$E_{i+1} = \frac{1}{R_{i+1} - R_i} \sum_{k=R_i}^{R_{i+1}} X_k^2 dk \qquad \text{[Equation 6]}$$

The energy differentiator 154 calculates a difference ($D_i$) between energy $E\{X_i^2\}$ in the i'th interval and energy $E\{X_{i+1}^2\}$ in the (i+1)'th interval, as obtained in Equation 6. The difference between the energies $E\{X_i^2\}$ and $E\{X_{i+1}^2\}$ may be expressed as a difference between the squares of the transmission power levels, as defined in Equations 3 and 5, i.e., a difference between a square $A_i^2$ of the transmission power level of a received signal for the i'th interval in the i'th interval, and a square $A_{i+1}^2$ of the transmission power level of a received signal for the (i+1)'th interval. The data rate decision block 156 determines the rate of the transmission data using the energy difference $D_i$ calculated at the energy differentiator 154. If $D_i$ is a desired value $A_i^2$ as in Equation 5, the data rate decision block 156 determines the data rate $R_i$ for the i'th interval as the rate of the presently transmitted data.

However, considering the actual channel environment, it is impossible that the energy difference between the two intervals as designated by $D_i$ is "0" or $A_i^2$. That is, the difference $D_i$ itself is a probability variable, where the conditional expectation of $D_i$ satisfies $E\{D_i|A_i^2 = A_{i+1}^2\} = 0$ and $E\{D_i|A_i^2 \neq A_{i+1}^2\} = A^2$. Thus, the data rate decision block 156 compares the energy difference $D_i$ between the two adjacent intervals with a threshold value to determine the data rate. More particularly, the data rate decision block 156 determines the data rate $R_i$ for the previous interval, the i'th interval as the data rate for the current interval when the energy difference $D_i$ between the two adjacent intervals is less than or equal to the threshold value. The threshold value can be designated as a medium value between "0" and $A^2$, i.e., $A^2/2$ according to a maximum likelihood (ML) principle. Here, A denotes the transmission power level of the received signal from the base station transmitter and $A^2/2$ is half the transmission power level of the received signal. The information about the data rate determined by the data rate decision block 156 is applied to the rate matching block 130 and the channel decoder 140, as shown in FIG. 1.

Figure 4:
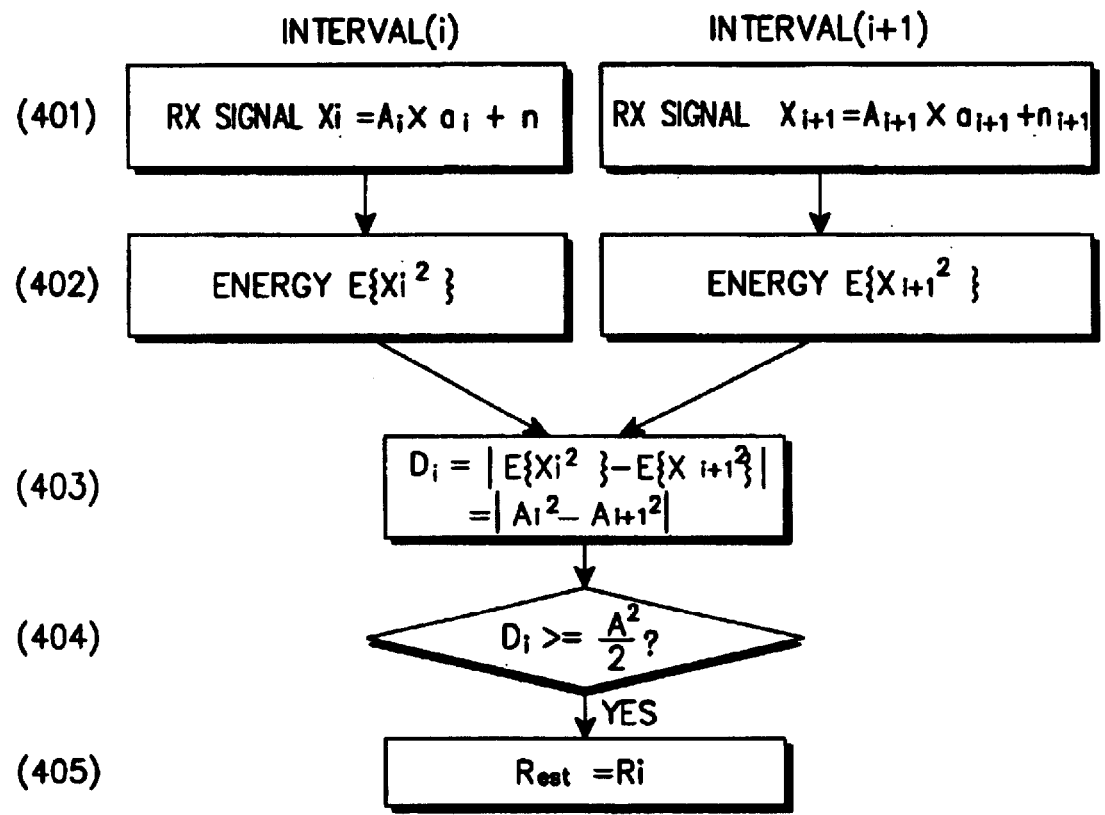
FIG. 4 is a flow chart illustrating the (i+1)'th interval data rate detecting operation in accordance with the present invention.
Figure 5:
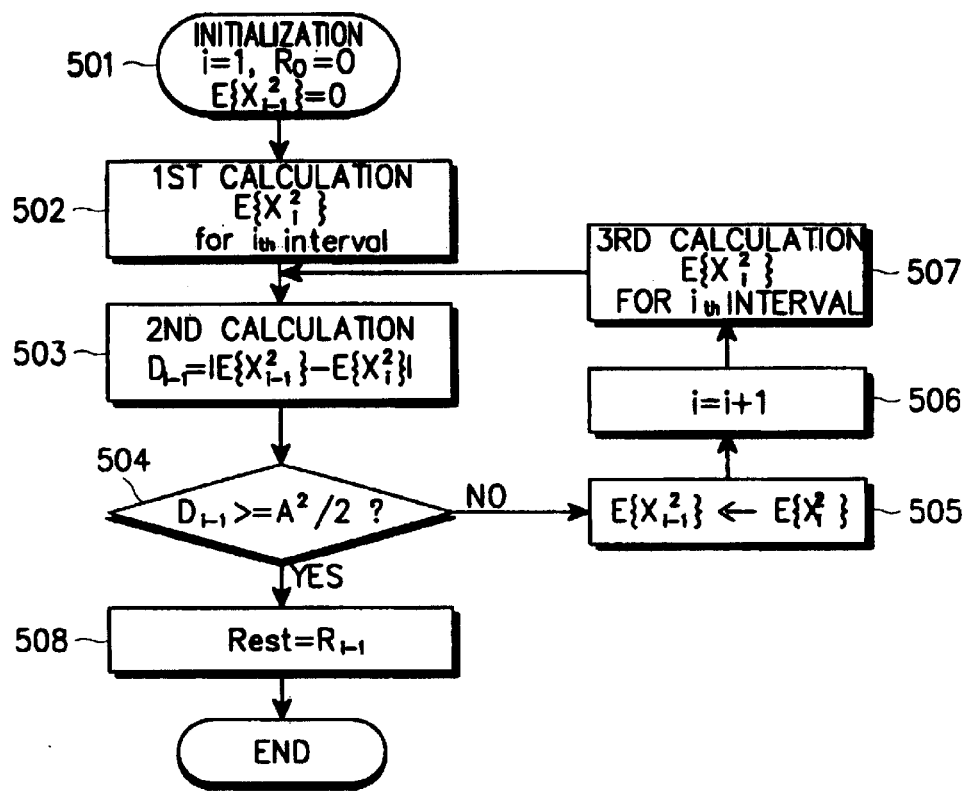
FIG. 5 is a flow chart illustrating the i'th interval data rate detecting operation in accordance with the present invention.

The flow chart of FIGS. 4 and 5 illustrate a data rate detecting operation using the above equations which is performed at the data rate detector 150 shown in FIG. 3. FIG. 4 is a flow chart illustrating an operation of detecting the data rate for the (i+1)'th interval from the energies of the received signals for the two adjacent intervals, the i'th and (i+1)'th intervals. FIG. 5 is a flow chart illustrating a general operation of detecting the data rate for the i'th interval.

Referring to FIG. 4, the data rate detector 150 shown in FIG. 1 calculates the energy difference $D_i$ between the two adjacent intervals for each iteration and compares the energy difference $D_i$ with a threshold value $A^2/2$. The data rate detector 150 estimates the data rate $R_i$ for the i'th interval as an actual data rate $R_{est}$, in step 405, when the energy difference $D_i$ is greater than or equal to the threshold value.

Specifically, the energy calculator 152 shown in FIG. 3 accumulates received signal $X_i$ between the (i−1)'th interval and the i'th interval in step 401, and calculates energy $E\{X_i^2\}$ for the received signal $X_i$ in step 402. Also, the energy calculator 152 accumulates received signal $X_{i+1}$ between the i'th interval and the (i+1)'th interval and calculates energy $E\{X_{i+1}^2\}$ for the received signal $X_{i+1}$ in step 402. The energy differentiator 154 calculates an energy difference between the two adjacent intervals, in step 403. That is, the energy differentiator 154 determines the energy difference between the two intervals as $D_i = |E\{X_i^2\} - E\{X_{i+1}^2\}|$. As previously stated, the energy difference can also be expressed as $D_i = |A_i^2 - A_{i+1}^2|$. In step 404, the data rate decision block 156 compares the energy difference between the two adjacent intervals with a threshold value, i.e., it determines whether the energy difference $D_i$ is greater than or equal to the threshold value $A^2/2$. When the energy difference $D_1$ is greater than or equal to the threshold value $A^2/2$, the data rate decision block 156 estimates the data rate $R_i$ for the i'th interval as the actual data rate $R_{est}$ for the current (i+1)'th interval, in step 405. The estimated data rate is provided to the DTX bit extractor 120, the rate matching block 130 and the channel decoder 140, as shown in FIG. 1, and used for rate matching and channel decoding operations.

Referring to FIG. 5, in step 501, the data rate detector initializes the search interval i to "1" and the average power (energy) for the previous interval $E\{X_{i-1}^2\}$ to "0". The energy calculator 152 shown in FIG. 3 calculates, in step 502, the average power for the search interval 1, i.e., first calculates the average power for the current interval $E\{X_i^2\}$. In step 503, the energy differentiator 154 calculates (a second calculation) an energy difference between the previous interval and the current interval according to discriminating equation $D_{i+1}$. If the data rate decision block 156 determines in step 504 that the result of discriminating equation $D_i$ is greater than or equal to the threshold value $A^2/2$ (where, the data rate means "0" kbps as i=1), the data rate decision block 156 estimates the data rate for the current interval $R_{est}$ as the data rate for the previous interval ($R_{i-1}$) in step 508.

Otherwise, i.e., if it is determined in step 504 that the result of discriminating equation D is less than the threshold value $A^2/2$, the data rate decision block 156 stores the average power $E\{X_{i-1}^2\}$ for the current interval in the average power $E\{X_{i-1}^2\}$ for the previous interval in step 505, and increases i by one for searching the next interval in step 506. The energy calculator 162 in step 507 calculates (a third calculation) the average power in the interval i+1 and then stores the calculated average power in the average power $E\{X_i^2\}$ for the current interval. The process returns to step 503 to calculate the discriminating equation $D_{i-1}$ based on the average power $E\{X_i^2\}$ and compares in step 504 the result value of the discriminating equation $D_{i-1}$ with the threshold value.

While repeating the above procedures, when it is determined as $D \geq A^2/2$ in step 504, the data rate decision block 156 estimates the data rate $R_{est}$ of the current interval as the data rate $R_{i-1}$ up to the previous interval.

As described above, the present invention estimates a data rate for a received signal prior to a decoding operation even when no information about the data rate is received from the base station transmitter, which reduces the complexity as compared to the conventional BRD operation which detects the data rate after Viterbi decoding and the CRC check. The present invention thereby reduces the complexity in detecting the rate of turbo-encoded data without a need of a rate-based decoding operation, in the worse case, as often as the maximum number of iterations.

Furthermore, the present invention determines the data rate using only accumulated statistics, irrespective of the type of the channel encoder, and is thus compatible with any channel encoder. For example, even with a convolutional encoder is used, the present invention makes it possible to estimate the data rate with reliability for a frame whose data rate is not less than a threshold value.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for detecting a data rate in a mobile communication system, comprising the steps of:
   dividing an interval defined as between a lowest and highest one of a plurality of predetermined data rates into m discriminating intervals, wherein m is an integer; and
   calculating a difference between an average energy of received signals up to an i'th discriminating interval and an average energy of received signals for an (i+1)'th discriminating interval, wherein i is an integer and is less than m; and
   when the difference between the average energies is greater than or equal to a threshold value, determining that the received signal in the (i+1)'th discriminating interval is transmitted at a data rate corresponding to the i'th discriminating interval.

2. The method as claimed in claim 1, wherein the threshold value is defined as $A^2/2$, wherein A represents a transmission power level of the received signal up to the i'th discriminating interval.

3. A device for detecting a data rate in a mobile communication system, in which an interval is defined as between a lowest and highest one of a plurality of given data rates being divided into m discriminating intervals, wherein m is an integer, the device comprising:
   an energy calculator for calculating an average energy of received signals up to an i'th discriminating interval and an average energy of received signals for an (i+1)'th discriminating interval, wherein i is an integer and is less than m;
   an energy differentiator for calculating a difference between the average energy of received signals up to the i'th discriminating interval and the average energy of received signals for the (i+1)'th discriminating interval; and
   a data rate decision block for determining a data rate corresponding to the i'th discriminating interval as a data rate for the received signal in the (i+1)'th discriminating interval, when the difference between the average energies calculated in the energy calculator is greater than a threshold value.

4. The device as claimed in claim 3, wherein the threshold value is defined as $A^2/2$, wherein A represents a transmission power level of the received signal up to the i'th discriminating interval.

5. A method for detecting a data rate in a mobile communication system, in which a base station has previously provided a mobile station with information about a plurality of data rates variably serviceable and the mobile station detects one of the plurality of data rates as a data rate for a received signal, the method comprising the steps of:
   (a) dividing an interval defined as between a lowest and highest one of the plurality of data rates into m discriminating intervals, wherein m is an integer; and
   (b) calculating an average energy of a received signal corresponding to a first discriminating interval out of the m discriminating intervals;
   (c) calculating an average energy of a received signal corresponding to a second discriminating interval next to the first discriminating interval;
   (d) calculating a difference between the average energies obtained in steps (b) and (c); and
   (e) estimating that the received signal for the second discriminating interval is transmitted at a data rate corresponding to the received signal for the first discriminating interval, when the difference between the average energies is greater than or equal to a threshold value, or
   setting the first discriminating interval as the next discriminating interval when the difference between the average energies is greater than or equal to the threshold value,
   the steps (b) to (e) for the received signals up to the newly set discriminating interval being repeated until the difference exceeds the threshold value.

* * * * *